(No Model.)
A. & E. GROSSMANN.
ATTACHMENT TO BRIDLES.
No. 273,511. Patented Mar. 6, 1883.
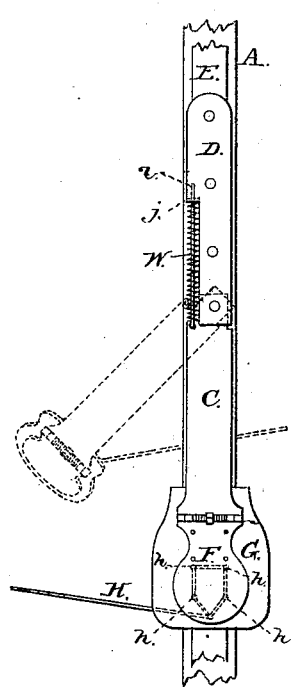
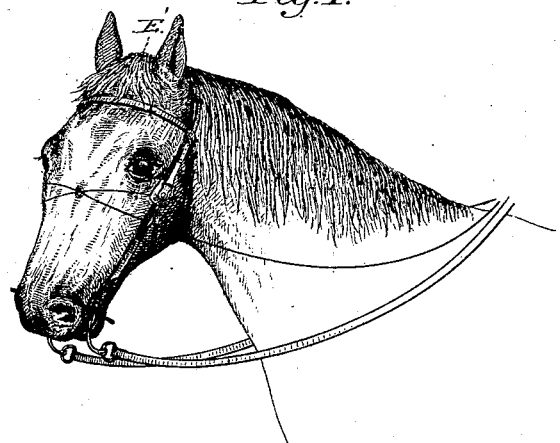
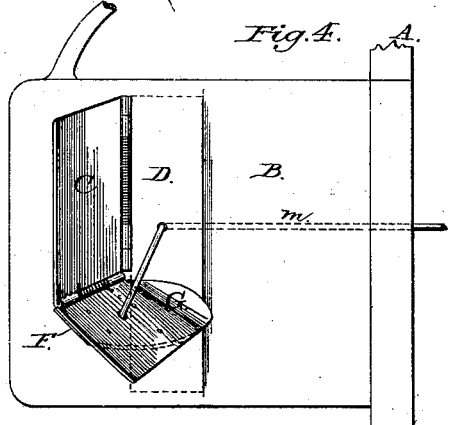
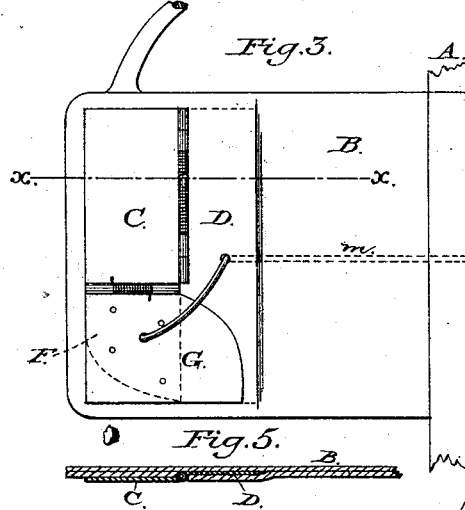
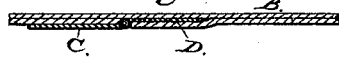
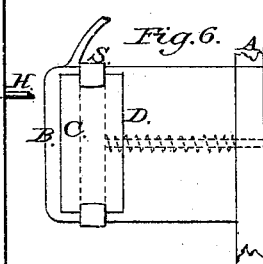
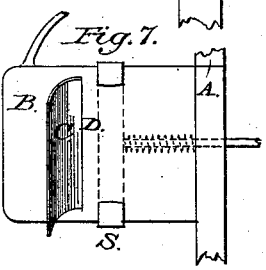
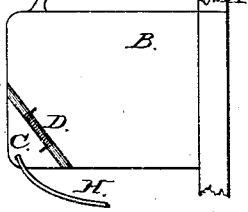
Witnesses:
John A. Ellis
Philip Maurd
Inventors:
Albert Grossmann
Edward Grossmann
by A. Pollok
their Attorney.

UNITED STATES PATENT OFFICE.

ALBERT GROSSMANN AND EDWARD GROSSMANN, OF NEW YORK, N. Y.

ATTACHMENT TO BRIDLES.

SPECIFICATION forming part of Letters Patent No. 273,511, dated March 6, 1883.

Application filed January 3, 1883. (No model.)

*To all whom it may concern:*

Be it known that we, ALBERT GROSSMAN and EDW. GROSSMANN, of New York city, in the county of New York and State of New York, have invented a new and useful Improvement in Attachments to Bridles for Horses, which improvement is fully set forth in the following specification.

Our invention has for its object the control of a restive or vicious horse when bridled by quickly covering his eyes, so as to completely darken his vision so soon as he may become alarmed or fractious.

It consists in fitting the headstall of the bridle with movable blinders, either as an element of the ordinary winkers, or, where these are dispensed with, as an independent attachment to the bridle, the blinders in either case being so pivoted or hinged to the winker or headstall as to admit of being drawn, when required, over the eyes of the horse by means of light cords extending therefrom to within ready reach of the driver or rider's hand.

In the accompanying drawings, Figure 1 illustrates our invention as applied to the bridle of a saddle-horse; Fig. 2, an elevation, upon an enlarged scale, of our improved blinder, its position when drawn over the eye of the horse being indicated by dotted lines. Fig. 3 illustrates the invention as applied to a winker, the inner side of the winker and the blind hinged thereto being shown in elevation. Fig. 4 is a similar view, showing the blind drawn into position to cover and partly inclose the horse's eye. Fig. 5 is a section in line *x x* of Fig. 3. Fig. 6 is an elevation of the inner side of a winker, illustrating a modification of our invention, the blind being thrown open. Fig. 7 is a similar view, illustrating the form of blind shown in Fig. 6 when thrown out in front of the horse's eye. Fig. 8 illustrates another modification of our invention.

A in the drawings represents the side strap of the headstall in an ordinary bridle.

B, Figs. 3 to 8, represents a winker of the ordinary form, attached to the headstall in the customary manner.

C, Figs. 1 and 2, is a narrow metallic plate pivoted at *a* to a second narrow plate, D, riveted or otherwise secured to a strap, E, which is led to the top of the bridle through loops in the side strap, A, thereof. The two straps E on either side are buckled together on the top of the bridle, (see at E, Fig. 1,) so as to admit of being lengthened or shortened for adjustment, and of entire removal when desired. The pivoted plate C is held in position in line with the fixed plate D of the bridle by means of a straight rod, *i*, which projects rigidly from the inner upper angle of the pivoted plate upward, and passes loosely through an eye, *j*, formed in line therewith upon the face of the fixed plate. This rod carries an encircling spiral spring, W, interposed between the eye *j* and the edge of the pivoted plate at the base of the rod *i*, so that when the plate is swung upon its pivot, as shown in dotted lines, Fig. 2, the spring will be compressed. The edge of the plate D next to the spring is cut away to allow space for the spring E. (See positive lines in Fig. 2.)

The pivoted plate C serves as an arm to carry a blind hinged by a spring-hinge to its lower end. This blind consists of a small circular or oblong metallic plate, F, upon the under or inner side of which is fitted a rubber or leather disk, G, secured thereto at its upper end, and which is large enough to fully cover the eye of a horse. To the center of this disk is attached a small silk cord, H, so that it shall pull thereon at four points, *h h h h*, and thereby draw it into a cup shape. This cord is led across the nose of the horse and through a loop in the side strap, and, passing loosely over the neck, within reach of the rider, is led back through a loop on the opposite side strap and secured to the disk of the blind on the opposite side. By pulling upon this cord the disks on each side of the bridle are drawn inward, and the plate C of each, swinging upon its pivot, will carry the blind over the horse's eye, while each blind F, swinging also upon its hinge, will fold upward sufficiently to allow its flexible disk to fit closely over the eye, the pull of the cord thereon serving to shape it into a concave form adapted to inclose the projection of the eye, and thus shut out the light therefrom. When the cords are let loose the action of the spring E and of the spring-hinge of the blind F will automatically throw back the plate C and blind F to their normal position. Where the blinds are to be used in connection with winkers of the ordinary form, one edge of the metallic plate C (see Figs. 3 and 4) is pivoted by a spring-hinge to a fixed plate, D, riveted or otherwise secured to the inner side of the winker, the face of the winker being recessed sufficiently (see Fig. 5) to receive it without an undue increase of its thickness. A second plate or blind-piece F (see dotted lines, Figs. 3 and 4) is hinged to the lower edge of the hinged blind C by means of a spring-hinge, and to the inner side of this plate F is secured a piece, G, of rubber or soft leather, adapted, when the blinds are drawn over the horse's eye, to fit in under the eye. The cord H, by which the blind is to be closed, is attached to this flexible piece, and is led therefrom through a tubular opening formed longitudinally in the winker (see dotted lines m in Figs. 3 and 4) to the side strap of the headstall, and thence back through rings in the harness to within reach of the driver's hand. When drawn upon, the cord will swing the upper section, C, inward, and the lower section and flexible disk, F, of the blind upward and close the same effectually over the eye of the horse; but so soon as the cord is released the hinged sections will be thrown back to their normal position and the eye uncovered by the automatic action of the springs in the hinges.

Figs. 6 and 7 illustrate a modification of our invention, in which the blind C is constructed of a thin curved elastic plate of metal, which, when left free, tends automatically to bend or curve in over the eye of the horse. (See Fig. 7.) This curved plate is secured to the winker by its inner edge only, and is straightened out and thrown open, and thereafter held open, by means of a sliding bar, S, whose edges fold over upon the top and bottom edges of the winker, so as to slide freely thereon, and which is forced outwardly upon the winker and over the elastic plate C by means of a spiral spring, n, encircling a central arm, N, extending rearwardly from the plate to the strap of the headstall, and to which the cord H is attached. When forced outwardly by the spring n the slide-bar S will operate to straighten back the plate C against the side of the winker; but when drawn back by a pull upon its attached cord H it allows the plate to curve in in front of and over the eye of the horse to blind it.

In the modification illustrated in Fig. 8 the lower outer corner of the winker is adapted to fold inward when pulled by a cord H, being thrown back automatically to its normal position, when released, by the action of the spring in the hinge. In like manner the entire outer end of the winker may be hinged, with a spring-actuated hinge or joint, so as to admit of being doubled or folded inward, when required, in front of the horse's eye to blind it; and we contemplate in our invention all such equivalent modifications in which a portion of the winker, or otherwise a plate or piece attached to the winker, is adapted, either by means of a hinged joint or by reason of the flexibility of the piece, to fold or bend over the eye of the horse when actuated by means of a draw-cord arranged for the purpose.

Instead of leading the cords through the side straps of the headstall, they may be led up through loops or rings in the front piece, and so on over the head, between the horse's ears, to within reach of the rider or driver.

By the use of the appliances described a horse, becoming frightened by the approach of a train of cars, a bicycle, or by any unusual noise or occurrence, is quickly mastered and readily quieted by simply compelling him to close his eyes, this being instantly accomplished by closing the blinders over the eyes through the agency of a pull upon the light draw-cord arranged for the purpose. By thus hoodwinking him a saddle-horse difficult to mount may be kept quiet until the rider has gained his seat, and, in fact, our simple device affords the means for the complete mastery of this noble animal.

We claim as our invention—

1. A device for hoodwinking horses, comprising blinds carried by the side straps of a bridle or halter, and connected therewith by means of a hinge, in combination with operating-cords and separate springs for each blind, substantially as described.

2. The combination, with a bridle or halter, of hoodwinking-blinds independently connected with the said bridle or halter by spring-hinges, and provided with operating-cords, substantially as described.

3. In combination with a bridle or halter, a hoodwinking-blind comprising two parts, the one hinged to the bridle or halter and the other hinged to it, substantially as described.

4. A hoodwinking-blind hinged to the ordinary winker of a bridle, and combined with operating-cords, substantially as described.

5. The combination, with a bridle or halter, and with metal plates D, supported by the side straps, A, thereof, of blinds C, hinged or pivoted to the plates D, and cords H, joined to said blinds and led thence through eyes or loops in the headstall, substantially in the manner and for the purpose herein set forth.

In testimony whereof we have signed this specification in the presence of two subscribing witnesses.

ALBERT GROSSMANN.
EDWARD GROSSMANN.

Witnesses:
JAMES F. THOMSON,
SAMUEL THOMSON.